United States Patent [19]

Gamblin

[11] 4,198,642

[45] Apr. 15, 1980

[54] INK JET PRINTER HAVING INTERLACED PRINT SCHEME

[75] Inventor: Rodger L. Gamblin, Oakwood, Ohio

[73] Assignee: The Mead Corporation, Dayton, Ohio

[21] Appl. No.: 867,669

[22] Filed: Jan. 9, 1978

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,689,693 | 9/1972 | Cahill et al. | 346/75 X |
| 3,701,998 | 10/1972 | Mathis | 346/75 |
| 3,871,004 | 3/1975 | Rittberg | 346/75 |
| 4,009,332 | 2/1977 | Van Hook | 346/75 X |

OTHER PUBLICATIONS

Bruce, G. D., Ink Jet Nozzles in a Ring Array, IBM Technical Disclosure Bulletin, May 1976, vol. 15, No. 11, pp. 3917–3918.

*Primary Examiner*—George H. Miller, Jr.
*Attorney, Agent, or Firm*—Biebel, French & Nauman

[57] ABSTRACT

An ink jet printer for printing an image on an intermittently moving print web includes a print head means for generating a number of ink jet drop streams which are directed at the web. Each of the streams provide for printing along an associated print line on the web, with the spacing in the direction of web movement between adjacent drop streams being an integer multiple of the width of a print line. This integer multiple is chosen to have no prime factors greater than unity in common with the number of jets which are generated by the print head means. The print web is moved intermittently past the print head means by a distance equal to the product of the width of a print line times the number of jet streams which are generated by the print head means. The print head means is moved transversely across the print web after each intermittent movement of the print web such that a number of print lines across the print web are serviced. Uninterrupted printing may be accomplished along the length of the print web. An alternative printer arrangement is disclosed in which the print head means generates ink jet drop streams at only some of the print positions on the print head means such that bands of print lines are interlaced therewith which receive no ink jet drops thereon.

7 Claims, 5 Drawing Figures

INK JET PRINTER HAVING INTERLACED PRINT SCHEME

BACKGROUND OF THE INVENTION

The present invention relates to printing devices and, more particularly, to devices in which recording is accomplished by means of an ink jet printer.

Ink jet printers, such as shown in U.S. Pat. No. 3,701,998, issued Oct. 31, 1972, to Mathis, have gained increasing popularity, due in part to the ease with which such printers may be interfaced with electronic data processing equipment. In an ink jet printer, one or more orifices receive an electrically conductive recording fluid, such as for instance a water base ink, from a pressurized fluid supply manifold and eject the ink in one or more parallel jet drop streams. These recorders accomplish graphic reproduction by selectively charging and deflecting the drops in each of the streams and, thereafter, depositing at least some of the drops on a sheet or web of copy paper or other print material. Charging of the drops is accomplished by application of control signals to charging electrodes positioned near each of the streams. As each drop breaks off from its parent fluid filament, it carries with it a charge which is, in effect, a sample of the voltage present on the associated charge electrode at the instant of charge separation. Thereafter, the drop passes through an electrostatic field and is deflected in the field direction by a distance which is proportional to the magnitude of the drop charge. Various printers have been developed in which the drops are charged binarily for print or no print operation. Other printer systems selectively charge drops to various print potentials and deflect the drops from each jet to a number of print positions.

It will be appreciated that the resolution of the final print image is a function of the size of the ink drops and the inter-drop spacing on the print material. The spacing between the jets on a print head is limited by the size of the charge electrode structures adjacent associated jets and the deflection electrodes. The spacing between jets, in turn, is a factor which must be taken into account in design of a system to insure that sufficient image resolution is provided.

A number of approaches have been taken to insure sufficient resolution of the print image. As disclosed in the above cited Mathis patent, multiple rows of jets may be positioned in tandem with each row servicing print lines on the print medium which interlace with the print lines serviced by other rows of jets. In another approach, jets may be spaced apart by substantial distances and the print medium repeatedly scanned. After a sufficient number of scans, each jet will have serviced a number of print lines on the print medium forming a band of a width equal to the inter-jet spacing. Such an arrangement is shown in a drum copier environment in U.S. Pat. No. 3,689,693, issued Sept. 5, 1972, to Cahill et al, and assigned to the assignee of the present invention.

Another approach taken is disclosed in U.S. Pat. No. 4,009,332, issued Feb. 22, 1977, to Van Hook. In Van Hook, one or more more jet arrays are moved axially along a rotating drum upon which a sheet of copy paper is mounted. In a single array embodiment, comprising n nozzles spaced k resolution elements apart print lines along the axis of the drum, and the nozzle array is advanced axially with respect to the drum by n resolution elements during each revolution of the drum. The numbers k and n are chosen such that they have no prime factors in common greater than unity. Rotation of the drum and movement of the jet array in this system are continuous and result in a plurality of interlaced print lines which are slightly inclined with respect to the copy paper. IBM Technical Disclosure Bulletin Volume 15, Number 11, dated May 1976, at page 3917 discloses a similar interlace scheme in which the jet nozzle array is positioned circumferentially around the print drum.

The above interlace schemes are not readily adaptable to a computer print out device in which successive lines of print information are provided by a computer to a line printer device in the sequence in which they are to be printed since these schemes require the assembly of a complete page of image information prior to printing. U.S. Pat. No. 3,871,004, issued Mar. 11, 1975, to Rittberg, discloses a print arrangement for printing lines of image information across an intermittently moving print web. After each movement of the print web, the print head is moved across the web and a number of print lines are imaged. In the Rittberg device, resolution is increased by providing deflection electrodes which deflect the drops from each jet to a number of print lines. Extensive reorganization of the print data is required before it can be supplied to the print head.

Accordingly, there is a need for a non-contacting printing device in which printing may be accomplished with good resolution across an intermittently moving print medium and in which sufficient inter-jet distance may be maintained without undue reordering of print information.

SUMMARY OF THE INVENTION

An ink jet printer for printing along at least some of a plurality of parallel adjacent print lines which extend across a print medium includes a print head means which defines n print positions. Each of the n positions is spaced from adjacent print positions in a first direction by a distance equal to the integer k times the width of a print line. The integer k has no common factor greater than one with the integer n. Means are provided for periodically moving the print medium with respect to the print head means and in the first direction by a distance equal to n times the width of a print line. Additionally, means are provided for periodically moving the print head means across the print medium in a second direction perpendicular to the first direction, such that each print position on the print head means moves along an associated print line on the print medium. A plurality of ink jet means at at least some of the n print positions on the print head means generate parallel jet streams of ink drops. A means for selectively directing drops in the jet streams toward the print medium is provided such that each jet will selectively print upon a print line associated with the print position.

The plurality of ink jet means may generate jet streams at alternate ones of the n print positions on the print head means when n divided by k is equal to 2 with a remainder of $\pm 1$ such that bands of print lines on the print medium are serviced by the plurality of jet means. Alternatively, the ink jet means may generate jet streams at all of the n print positions on the print head means such that all print lines on the print medium are serviced by the jet means.

Accordingly, it is an object of the present invention to provide a non-contact printing device in which a plurality of print lines across a print medium are serviced with intermittent movement of the print medium between each printing operation; to provide such a printing device in which an ink jet print head prints across the print medium along a plurality of print lines after each intermittent movement of the print medium past the ink jet printer; to provide such a printing device in which the distance between print lines serviced as the print head moves across the print medium is greater than the width of a print line and in which multiple print operations result in interlaced print lines; and, to provide such a printer in which the movement of the print head and the print medium result in bands of print lines across the print medium being serviced, with intermediate areas between the bands being unserviced by the print head.

Other objects and advantages of the present invention will be apparent from the following description, the accompanying drawings and the appended claims.

DETAILED DESCRIPTION OF THE INVENTION

Figure 1:
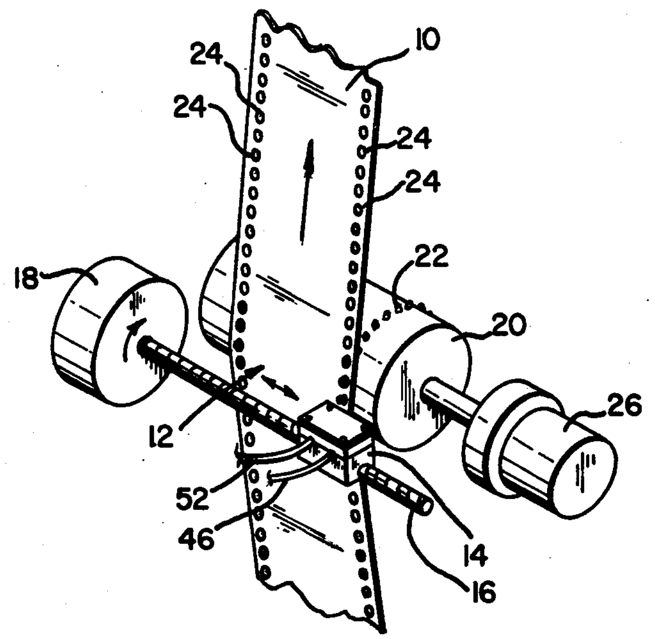
FIG. 1 is a perspective view showing the major components of the printer of the present invention.

The present invention relates to a non-contact printing devices and, more particularly, to an ink jet printer of the type which may be useful in printing alphanumeric or other print image information on an intermittently moving print medium. As depicted in FIG. 1, an intermittently moving medium 10 consists of a print web which extends adjacent a print station, indicated generally at 12. A print head means 14 generates a number of ink jet drop streams which are directed at the web 10. The print head 14 is mounted on a threaded rod 16 which is rotated by a motor 18 to control movement of the print head 14 across the print web 10. A drum 20 includes teeth 22 which are positioned circumferentially at each end and which engage holes 24 in the web 10. Drum 20 is rotated by stepping motor 26 such that the print web 10 is moved intermittently past the print head 14 and the printing station 12. It should be understood that both the mechanism for intermittently moving the print web 10 past the print station 12 and the mechanism for moving the print head 14 across the web 10 are depicted in only one of a number of possible arrangements.

Motors 18 and 26 are controlled such that print head 14 will be moved across the print web 10 while the web 10 is stationary. After the print head 14 has made a pass across the web 10 and serviced a plurality of print lines across the web, the stepping motor 26 will move the web by an appropriate distance, as described below, prior to the next printing pass of the print head 14 across the web 10. It will be appreciated that printing may be accomplished by the print head as the head is moving only in one direction. In such an arrangement, the print head will be returned to its initial starting position after each print operation during the time in which the web 10 is moved by the motor 26. Alternatively, the print head 14 may service print lines on the web 10 as it passes across the web 10 in both directions. Only minor variations in the data handling arrangement are necessary for either such configuration to reorder the print data.

Figure 2:
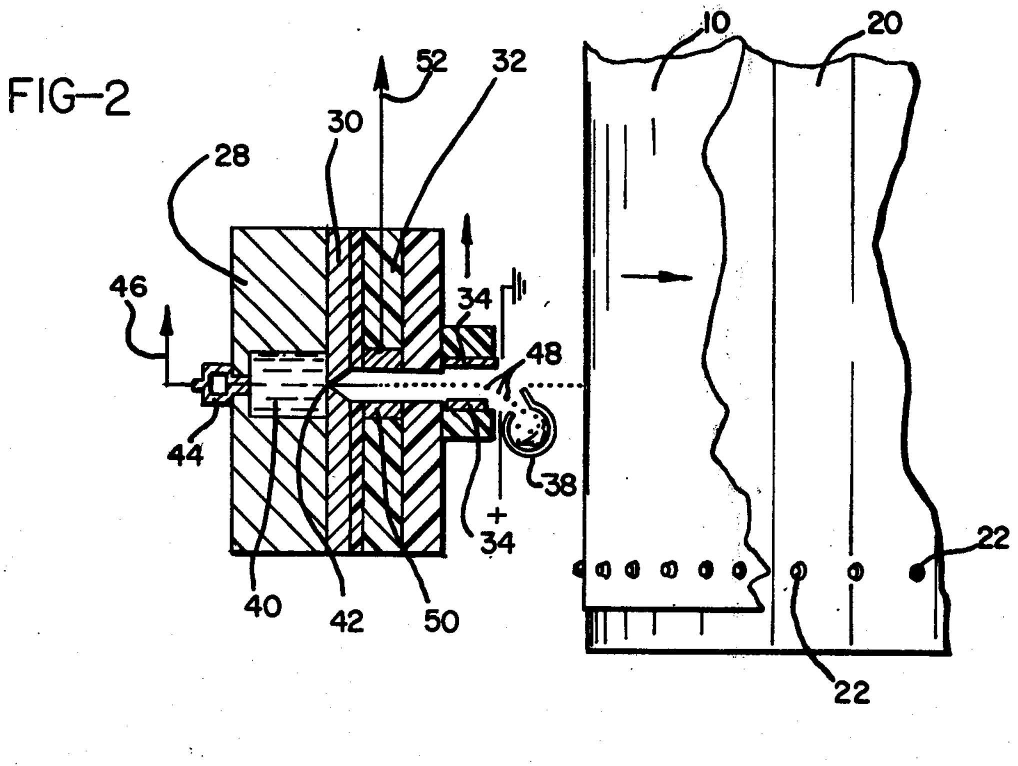
FIG. 2 is a view of a portion of the printer as seen looking from above in FIG. 1, with the ink jet print head in section.

FIG. 2 illustrates the print head 14 and the manner in which it operates in greater detail. A fluid supply manifold 28, an orifice plate 30, a charge ring plate 32, deflection electrodes 34, and a catcher 38 cooperate to generate a plurality of parallel jet streams of ink drops and to direct selectively drops in the jet streams toward the print medium 10 such that each jet will selectively print upon an associated print line extending across print medium 10. Drops generated by the printer are typically 0.004 inch in diameter and, therefore, the print lines defined by the jet streams on the print medium 10 may be approximately 0.004 inch in width. The manifold 28 contains a supply of printing ink 40 which flows under pressure through orifices 42 to form the jet streams. A stimulator 44, driven by a 100 kHz driving signal on line 46, stimulates the jet streams to break up into streams of drops 48.

The drops 48 are selectively charged by a series of charge rings 50 which are in registration with orifices 42. Those drops which are charged are deflected by deflection electrodes 34 into the catcher 38, while the uncharged drops proceed to deposit upon the print medium 10. Drop charging and deflection are carried out as taught by the above mentioned Mathis patent, with drop charging being under control of data processing signals applied to line 52.

Drop stimulation may be effected in such a manner that all drops in the drop streams are generated in phase. For this purpose there may be employed a stimulation arrangement as taught by Titus et al, U.S. Pat. No. 3,900,162, it being understood that the arrangement of FIG. 2 is a schematic illustration only.

Figure 3:
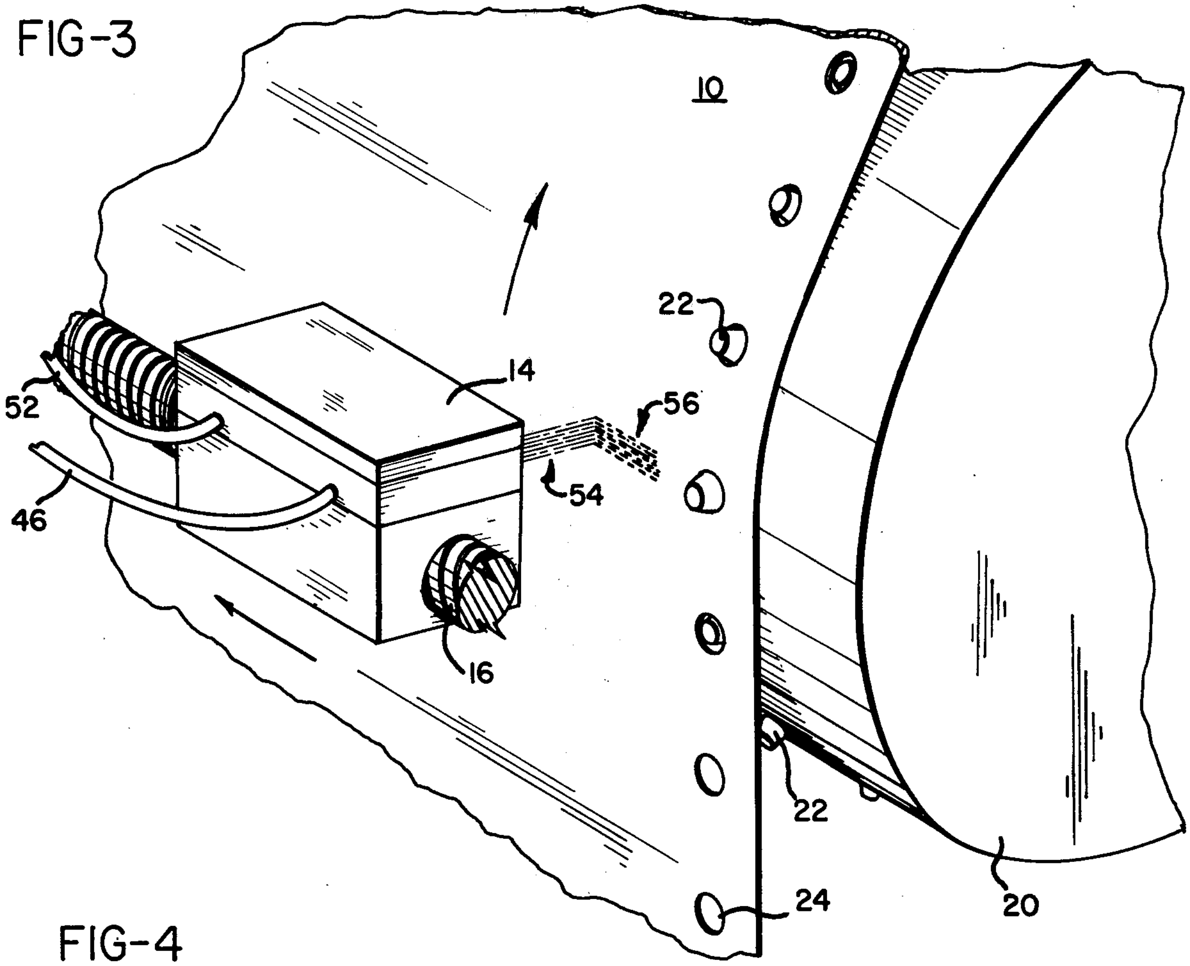
FIG. 3 is an enlarged view, similar to FIG. 1, of the print head and print medium.

Reference is now made to FIG. 3, an enlarged perspective view similar to FIG. 1. Print head 14 generates a number of ink jet drop streams 54 which are directed at the print web 10. Each drop stream provides for printing along an associated one of print lines 56 on web 10. To provide appropriate interlace of the print lines 56, as discussed below, the spacing in the direction of movement of web 10 between adjacent drop streams 54 is an integer multiple of the width of a print line 56. This integer multiple of the width of a print line has no prime factors greater than unity in common with the number of jets 54 which are generated by the print head means. After each movement of the print head means 14 across the print web 10, the print web 10 will be moved in the direction indicated by a distance equal to the product of the width of a print line 56 times the number of jets 54 generated by the print head means 14.

Figure 4:
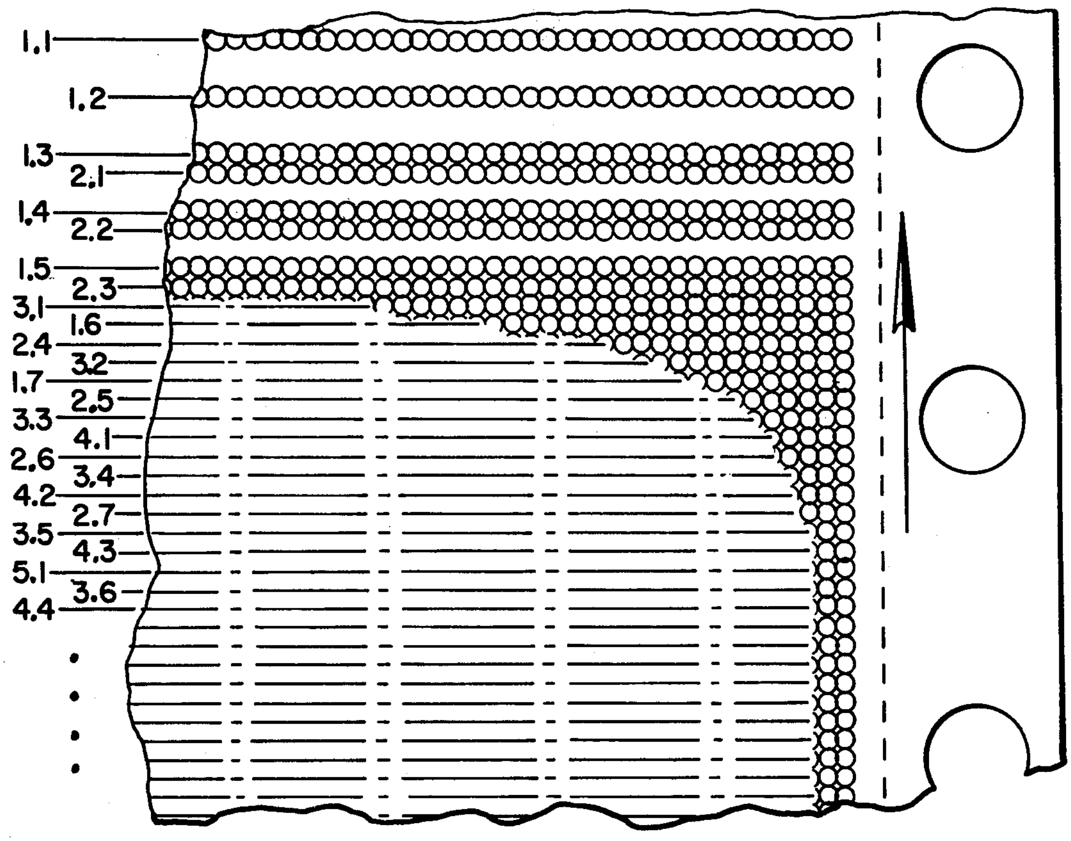
FIG. 4 illustrates diagrammatically the manner in which the rows of print lines interlace on the print medium.

The interlace pattern of the print lines which result from this scanning arrangement is illustrated in FIG. 4. To provide proper interlace, the print lines serviced during one printing pass of the print head 14 across the print medium 10 are spaced apart by a distance equal to a first integer k times the width of a print line q. The number of drop streams is chosen to be equal to a second integer n for servicing n print lines during each pass of the print head across the print medium. The integers k and n are chosen such that they have no common factor greater than one.

After each print operation in which the print head moves across the print medium 10, servicing n print lines, the print medium 19 will be moved by a distance equal to n times q in a direction perpendicular to that of the movement of the print head 14. After this movement of the print medium 10, a new print operation will be initiated in which the print head 14 will service n print lines. By use of this interlace scheme, uninterrupted printing may be accomplished along the length of the print web 10.

For the sake of illustration, a scanning arrangement in which seven jets (n=7) are spaced apart by three line widths center-to-center (k=3) is shown in FIG. 4. The movement of the web 10 necessary for proper interlace is a distance equal to seven times the width of a print line. In FIG. 4, each print line is designated with a two digit number; the first digit indicates the print operation or pass in which the line is serviced (first pass of the print head across the web, second pass of the print head across the web, etc.) and the second digit indicates which of the seven jets serviced the print line. An "all print" condition is shown in which all of the drops are deposited on the web. It should be understood, of course, that in actual operation, some of the drops will be directed to the print head catcher such that an image will be formed on the web 10 by the drops which are selectively deposited thereon. As illustrated in the upper portion of FIG. 4, several passes of the print head 14 across the web 10 must be made before a complete interlace condition is attained in which all print lines are serviced.

Figure 5:
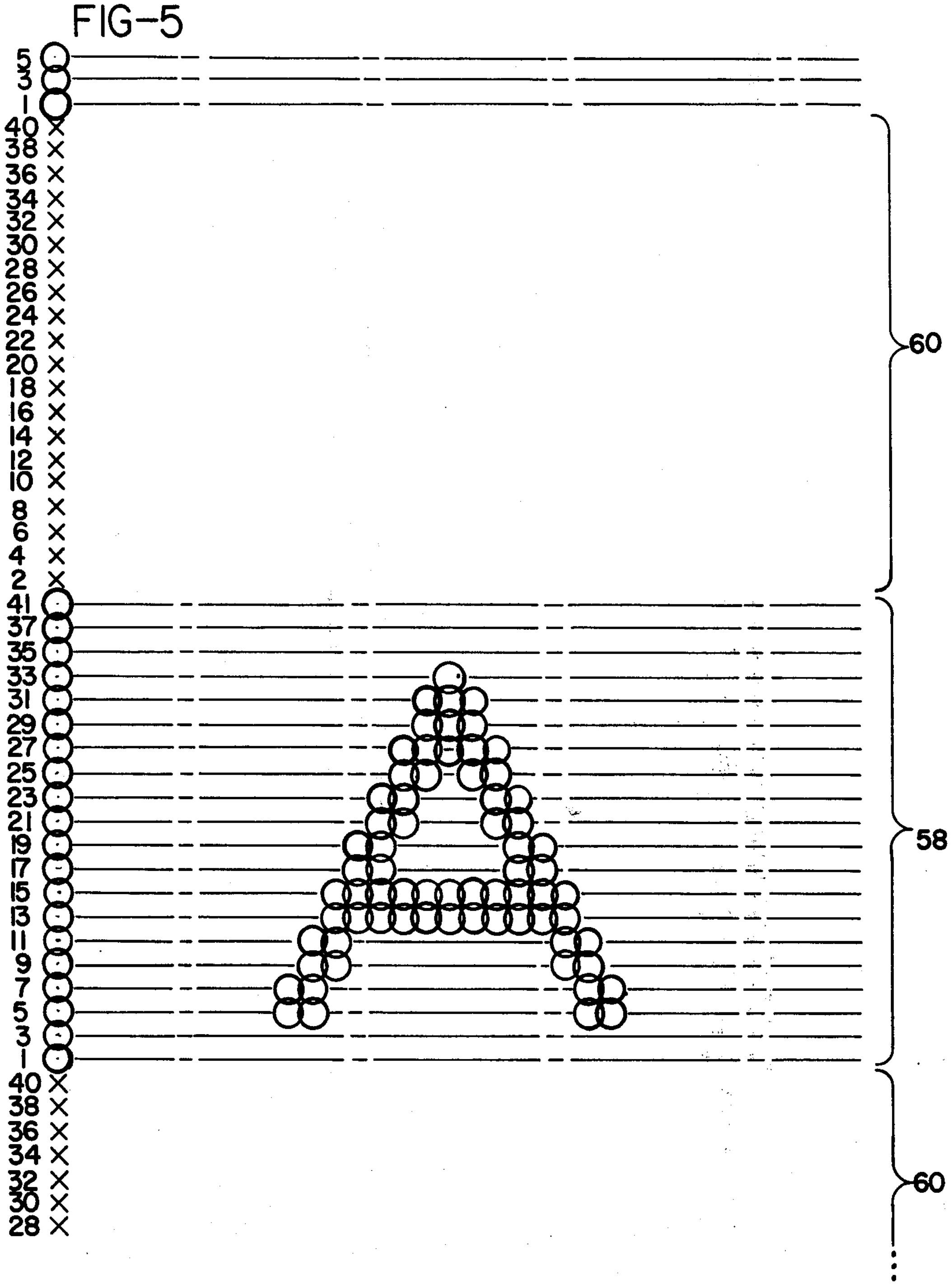
FIG. 5 shows the interlace arrangement is an alternative embodiment of the present invention.

Reference is now made to FIG. 5, in which the interlace pattern resulting from an alternative embodiment of the present invention is shown diagrammatically. In many print applications it is only necessary to be able to print alphanumeric information along groups or bands of print lines, with the spaces between adjacent bands receiving no jet drops. Such an application may be, for instance, a line printer of the type which is used for printing output information from data processing equipment. Such a device is not used for reproducing photographs or other image information requiring printing continuously across the surface of the print medium.

It has been determined that when the integers n and k are chosen such that n divided by k is equal to 2 with a remainder of ±1 that the interlace pattern which results is one having two distinct bands of print lines which alternate along the print web. One band of print lines will be printed by the odd numbered jets and the other band will be printed with even numbered jets.

It is apparent, therefore, that if the bands are of sufficient width, the alphanumeric information may be printed along only one of the two bands, with all of the drops in the jets servicing the other band being caught. The printer may be simplified by elimination of the jets on the print head means at the print positions on the print head associated with the band of print lines which is not to receive drops of ink. Since all of the odd or even numbered jets are eliminated, the spacing between the remaining jets is doubled, thus alleviating problems created by close inter-jet spacing.

In the interlace scheme shown in FIG. 5, the band of print lines 58 is serviced, as indicated, by jets at the odd print positions on a print head having 41 print positions. Adjacent the band 58 are bands 60 which would have been serviced by jets at the even numbered print positions on the print head, if the jets were provided at such positions.

Since the drops printing each print line are approximately 0.004 inch in diameter, the 21 print lines in band 58 will provide a band for print information approximately 0.084 inch in height. The interlaced bands 60 will provide spaces of approximately 0.080 inch between the bands of print information 58. Since n divided by k equals 2 with a remainder of 1, and in this case n=41, k must necessarily equal 20. The spacing between print positions on the print head is therefore 20 times the width of a print line or 0.080 inch. Since, however, jets are provided only at the odd numbered print positions on the print head, this interjet spacing will be doubled. A distance of 0.160 inch will therefore be provided between each adjacent jet. The print medium will be moved intermittently by a distance equal to n times q. In the example of FIG. 5, this will result in intermittent movement of a distance of 0.164 inch (41 times 0.004 inch).

It should be understood that other interlace arrangements may be provided in which more than two bands result. For instance, if n divided by k equals 3 with a remainder of plus or minus 1, the interlace pattern can be grouped into 3 bands. If printing on one or more of the bands is not required, the jets associated with the print positions on the print head servicing such bands may be eliminated. This arrangement may result, however, in a print head having jets positioned with respect to each other by varying inter-jet distances.

While the method and forms of apparatus herein described constitute preferred embodiments of the invention, it is to be understood that the invention is not limited to these precise method and forms of apparatus, and that changes may be made therein without departing from the scope of the invention.

What is claimed is:

1. An ink jet printer for printing an image on an intermittently moving print web, comprising:

print head means for generating a number of ink jet drop streams directed at said web, each of which streams providing for printing along an associated print line on said web, with the spacing in the direction of web movement between adjacent drop streams being an integer multiple of the width of a print line, said integer multiple of the width of a print line having no prime factors greater than unity in common with the number of jet streams generated by said print head means, means for moving the print web intermittently past the print head means by a distance equal to the product of the width of a print line times the number of jet streams generated by said print head means, and means for moving said print head means transversely across the print web after each intermittent movement of said print web, such that a number of print lines across the print web are serviced and uninterrupted printing may be accomplished along the length of the print web.

2. A printer for printing an image on an intermittently moving print web at a print station, comprising:

a print web extending adjacent the print station, means for printing on said web along a plurality of parallel print lines of uniform width at said print station, said print lines being spaced apart by a distance equal to a first integer multiple of the width of each of said print lines, and means for periodically moving said print web past the print station during intervals between print operations by a distance equal to a second integer multiple of said width of one of said print lines, said second integer being equal to the number of print lines printed during each print operation, and said first and second integers being numbers having no common prime factors greater than one.

3. A method of printing on an intermittently moving print web using an ink jet printer which provides a plurality of parallel jet streams of drops, each stream selectively directable to the web to service a print line of a predetermined width, comprising the steps of:

(a) directing n ink jets to said print web such that said jets strike said web defining n print lines of width q uniformly spaced apart by a distance equal to k times q, where k is an integer having no common factor with n greater than 1, (b) moving said print head across said web such that n print lines are serviced, and (c) moving said print web a distance equal to n times q after n print lines are serviced, and (d) repeating steps (b) and (c) a sufficient number of times such that a plurality of print lines across said web are printed.

4. An ink jet printer for depositing ink drops upon an intermittently moving print web, comprising:

print head means for selectively directing a plurality of ink jets at said print web, said plurality of jet consisting of n jets positioned in a row and spaced apart by a distance equal to k times the width q of a print line defined by a single jet, n having no common factor with k except for unity, means for moving said print head adjacent said web in a direction parallel to the surface of said web and perpendicular to the direction of web movement, said print head being oriented such that its motion is perpendicular to said row of jets, and means for intermittently moving said print web a distance equal to n times q such that said movement of said print head across said web occurs during periods in which said print web is not moving, whereby print lines serviced on said web by said jets during movement of said print head across said web interlace with previously and subsequently printed lines.

5. An ink jet printer for printing along at least some of a plurality of parallel adjacent print lines extending across a print medium, comprising:

a print medium, print head means defining n print positions, each of said n print positions being spaced from an adjacent print position in a first direction by a distance equal to k times the width of a print line, the integer k having no common factor with the integer n greater than one, means for periodically moving said print medium with respect to said print head means in said first direction by a distance equal to n times the width of a print line, means for periodically moving said print head means across said print medium in a second direction perpendicular to said first direction, such that each print position on said print head means moves along an associated print line on said print medium, a plurality of ink jet means on said print head means for generating parallel jet streams of ink drops at at least some of said n print positions, and means for selectively directing drops in said jet streams toward said print medium such that each jet will selectively print upon a print line associated with the print position to which it corresponds.

6. An ink jet printer according to claim 5 in which $n \div k = 2$ with a remainder of $\pm 1$ and in which said plurality of ink jet means generate jet streams at alternate ones of said n print positions on said print head means, such that bands of print lines on said print medium are serviced by said plurality of jet means.

7. An ink jet printer according to claim 5 in which said plurality of ink jet means generate jet streams at all of said n print positions on said print head means such that all print lines on said print medium are serviced by said plurality of jet means.

* * * * *